US012619633B2

(12) United States Patent　　　(10) Patent No.: US 12,619,633 B2
Whitaker et al.　　　　　　　　　　(45) Date of Patent: May 5, 2026

---

(54) FAST DATABASE SCALING UTILIZING A DECOUPLED STORAGE AND COMPUTE ARCHITECTURE

(71) Applicant: Amazon Technologies, Inc., Seattle, WA (US)

(72) Inventors: Andrew James Whitaker, Seattle, WA (US); Meet Kiritkumar Bhagdev, Seattle, WA (US); Sean Oczkowski, Seattle, WA (US); Saleem Mohideen, Saratoga, CA (US); Alexandre Olegovich Verbitski, Woodinville, WA (US); Murali Brahmadesam, Tiruchirappalli, TN (US); Navaneetha Krishnan Thanka Nadar, Bothell, WA (US); Li Che David Hsiao, Seattle, WA (US); Apoorv Birthare, Seattle, WA (US); Gajanan Sharadchandra Chinchwadkar, Fremont, CA (US); Jan Engelsberg, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1128 days.

(21) Appl. No.: 17/547,673

(22) Filed: Dec. 10, 2021

(65) Prior Publication Data

US 2023/0169093 A1　　Jun. 1, 2023

Related U.S. Application Data

(60) Provisional application No. 63/283,364, filed on Nov. 26, 2021.

(51) Int. Cl.
*G06F 16/27*　　　　(2019.01)

(52) U.S. Cl.
CPC ............ *G06F 16/278* (2019.01); *G06F 16/27* (2019.01)

(58) Field of Classification Search
CPC .............................. G06F 16/278; G06F 16/27
See application file for complete search history.

(56) References Cited

U.S. PATENT DOCUMENTS 9,507,843 B1 * 11/2016 Madhavarapu ..... G06F 16/2358
11,599,516 B1 * 3/2023 Sorenson ............ G06F 16/2282
(Continued)

FOREIGN PATENT DOCUMENTS

EP　　　　3260995 A1　12/2017
WO　　2017/062288 A1　4/2017

OTHER PUBLICATIONS

International Preliminary Report on Patentability, PCT App. No. PCT/US2022/080353, Jun. 6, 2024, 09 pages.
(Continued)

*Primary Examiner* — Kavita Stanley
*Assistant Examiner* — Lin Lin M Htay
(74) *Attorney, Agent, or Firm* — Nicholson De Vos Webster & Elliott LLP

(57)　　　　　ABSTRACT

Techniques for fast online scaling of a database via a split architecture including decoupled storage and compute tiers in a database service are described. A cluster of database (DB) nodes is scaled to add a new DB node. The scaling includes determining a split for data of a first volume managed by an existing DB node. A second DB node is obtained, and the first volume is cloned according to a lightweight copy technique to yield a second volume for use by the second DB node. After the cloning, a set of database modifications are applied to the second volume based on modifications caused by database traffic received by the first DB node, involving the volume, during the cloning of the
(Continued)

first volume. Each DB node may drop the portion of the volume that it does not need according to the split.

20 Claims, 9 Drawing Sheets

(56)                References Cited

U.S. PATENT DOCUMENTS

| | | | |
|---|---|---|---|
| 2017/0366624 A1 | 12/2017 | Tsang et al. | |
| 2018/0260125 A1* | 9/2018 | Botes ................. | G06F 11/2048 |
| 2019/0278757 A1* | 9/2019 | Palmer ............... | G06F 16/2246 |
| 2019/0332711 A1* | 10/2019 | Ramachandran ..... | G06F 16/178 |
| 2020/0250044 A1* | 8/2020 | Sharma .............. | G06F 11/3409 |
| 2024/0112167 A1* | 4/2024 | Uzo ...................... | G06Q 20/02 |

OTHER PUBLICATIONS

International Search Report and Written Opinion, PCT App. No. PCT/US2022/080353, Mar. 6, 2023, 11 pages.
Intention to Grant, EP App. No. 22830676.7, Apr. 9, 2025, 6 pages.
Lei Zeng, "Sharding with Amazon Relational Database Service", AWS, Mar. 20, 2019, 8 Pages.
Office Action, EP App. No. 22830676.7, Nov. 20, 2024, 12 pages.

* cited by examiner

300

CLIENT(S) 102

• • •

DATABASE SERVICE 110

MAPPING INFORMATION 216           PROXY LAYER 112

DATABASE CLUSTER 208A

COMPUTE TIER 202

DATABASE HEAD NODE 214N

DATABASE HEAD NODE 214A

DATABASE ENGINE 118

QUERY ENGINE 120

MEMORY 304

DATA PAGE CACHE 335

TRANSACTION LOG 340

UNDO LOG 345

STORAGE DRIVER 325

STORAGE NODES 206A-206M

STORAGE TIER 204

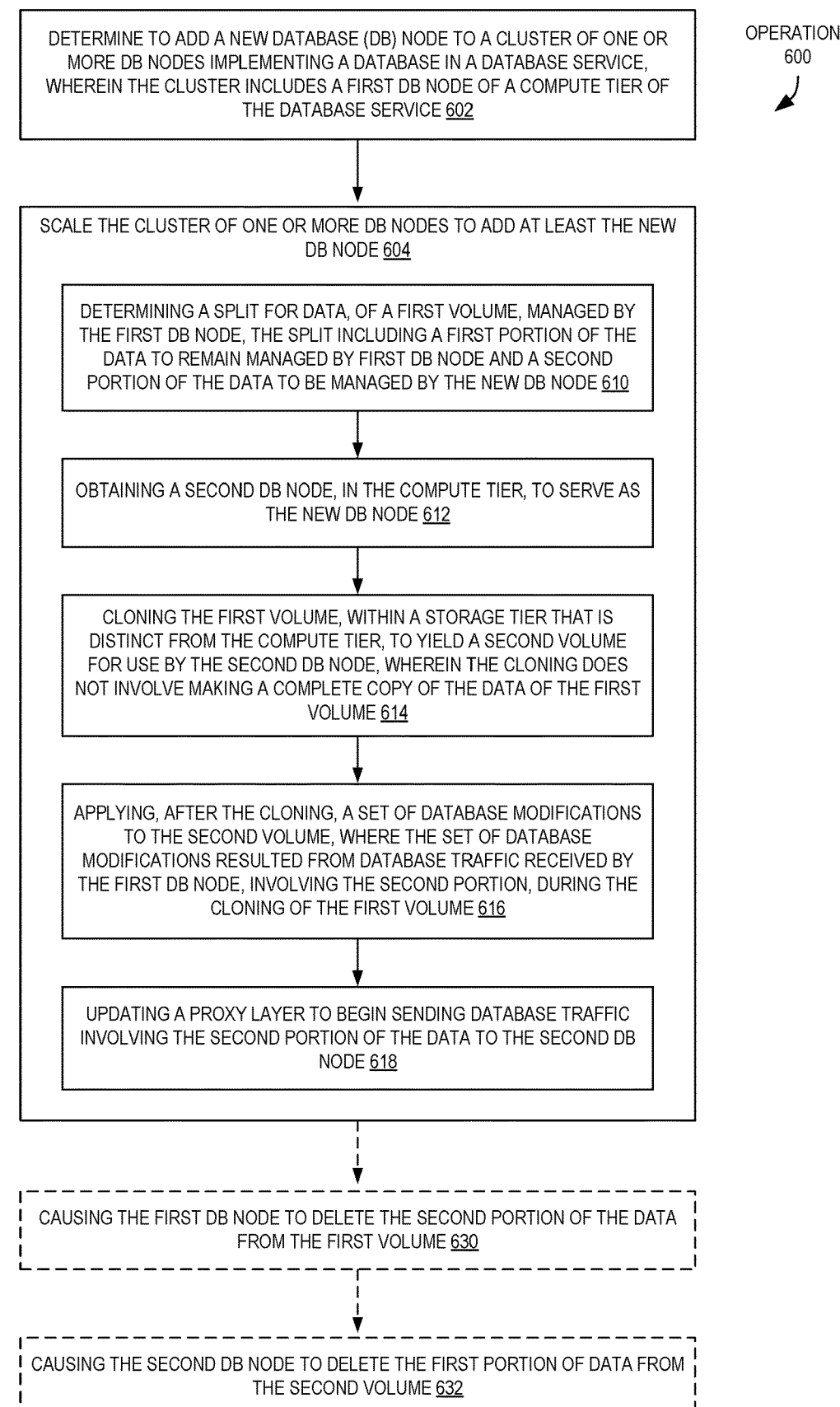

OPERATIONS
600

DETERMINE TO ADD A NEW DATABASE (DB) NODE TO A CLUSTER OF ONE OR MORE DB NODES IMPLEMENTING A DATABASE IN A DATABASE SERVICE, WHEREIN THE CLUSTER INCLUDES A FIRST DB NODE OF A COMPUTE TIER OF THE DATABASE SERVICE 602

SCALE THE CLUSTER OF ONE OR MORE DB NODES TO ADD AT LEAST THE NEW DB NODE 604

DETERMINING A SPLIT FOR DATA, OF A FIRST VOLUME, MANAGED BY THE FIRST DB NODE, THE SPLIT INCLUDING A FIRST PORTION OF THE DATA TO REMAIN MANAGED BY FIRST DB NODE AND A SECOND PORTION OF THE DATA TO BE MANAGED BY THE NEW DB NODE 610

OBTAINING A SECOND DB NODE, IN THE COMPUTE TIER, TO SERVE AS THE NEW DB NODE 612

CLONING THE FIRST VOLUME, WITHIN A STORAGE TIER THAT IS DISTINCT FROM THE COMPUTE TIER, TO YIELD A SECOND VOLUME FOR USE BY THE SECOND DB NODE, WHEREIN THE CLONING DOES NOT INVOLVE MAKING A COMPLETE COPY OF THE DATA OF THE FIRST VOLUME 614

APPLYING, AFTER THE CLONING, A SET OF DATABASE MODIFICATIONS TO THE SECOND VOLUME, WHERE THE SET OF DATABASE MODIFICATIONS RESULTED FROM DATABASE TRAFFIC RECEIVED BY THE FIRST DB NODE, INVOLVING THE SECOND PORTION, DURING THE CLONING OF THE FIRST VOLUME 616

UPDATING A PROXY LAYER TO BEGIN SENDING DATABASE TRAFFIC INVOLVING THE SECOND PORTION OF THE DATA TO THE SECOND DB NODE 618

CAUSING THE FIRST DB NODE TO DELETE THE SECOND PORTION OF THE DATA FROM THE FIRST VOLUME 630

CAUSING THE SECOND DB NODE TO DELETE THE FIRST PORTION OF DATA FROM THE SECOND VOLUME 632

*FIG. 6*

FAST DATABASE SCALING UTILIZING A DECOUPLED STORAGE AND COMPUTE ARCHITECTURE

CROSS-REFERENCE TO RELATED APPLICATIONS

This application claims the benefit of U.S. Provisional Application No. 63/283,364, filed Nov. 26, 2021, which is hereby incorporated by reference.

BACKGROUND

Traditionally, databases are able to "scale" to accommodate increased demand using a technique called sharding (which is sometimes called partitioning). The key idea of sharding is to subdivide a user's data across multiple backing nodes—or "shards"—so that the load is distributed. Typically, a proxy fleet is responsible for mapping a user's query to one or more of these shards, e.g., based on a user-provided shard key. A key challenge for such sharding implementations, however, is how to implement dynamic scaling—i.e., the ability to incorporate new shards into the system as it remains operational—in an efficient manner Traditionally, this process involves rebalancing (i.e., copying) data from an existing shard to a newly created shard.

BRIEF DESCRIPTION OF DRAWINGS

Various embodiments in accordance with the present disclosure will be described with reference to the drawings, in which:

FIG. 6 is a flow diagram illustrating operations of a method for scaling a database cluster using a decoupled storage and compute architecture according to some embodiments.

DETAILED DESCRIPTION

The present disclosure relates to methods, apparatus, systems, and non-transitory computer-readable storage media for implementing fast database scaling utilizing a decoupled storage and compute-based architecture.

Figure 1:
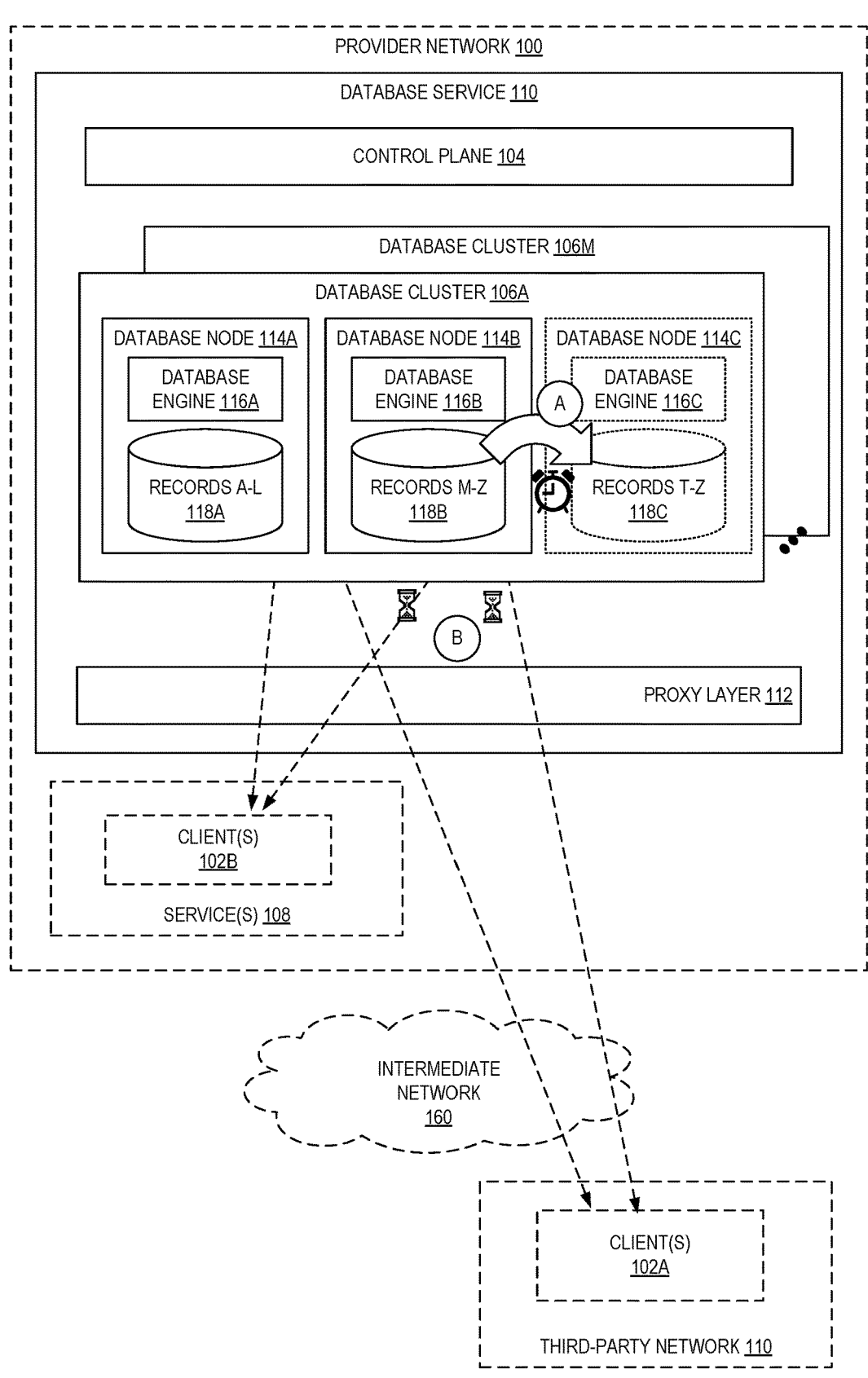
FIG. 1 is a diagram illustrating problematic aspects of scaling a database cluster in an online manner.

As indicated herein, dynamically scaling a database to incorporate new shards into a cluster is a key challenge, and typically involves rebalancing efforts by copying data from one or more existing shards to a new shard or set of new shards. For example, FIG. 1 is a diagram illustrating problematic aspects of scaling a database cluster 106A. In this example, a database may be implemented by a database service 110 (e.g., of a cloud provider network 100) via a database cluster 106A, where the database service 110 may implement a large number of different database clusters 106A-106M at any point in time for one or more (and typically many) different users.

Generally speaking, complex databases (e.g., relational databases, document databases, and the like) providing complex analysis/querying functionalities can be architected using a database cluster 106A of one or more database nodes 114. A database node may include an instantiation of a database, e.g., in the form of a database engine 116 (including a query engine) with associated data (shown here as a collection of "records" 118) belonging to the database that is "managed" by the node. In some embodiments, a database node may be implemented by launching a virtual machine or other type of compute instance having database software preinstalled or installed after the launch of the instance. In this example, for increased processing capability, a database can be "sharded" into being implemented by multiple different database nodes, here meaning that a first database node is responsible for a first portion of the data of the database (e.g., records A-L 118A of a particular table or collection of records, or datasets 1-10 of a collection of datasets, or the like) while a second database node may be responsible for a second portion of the database (e.g., records M-Z 118B).

In some cases, a control plane 104 set of components of the database service may determine that a rebalancing is to occur, that a particular database node 114B is exhausting its available resources (e.g., storage, memory, compute, bandwidth), that a user desires to rebalance the database (e.g., via receipt of a command from the user to do so), etc. Thus, the control plane may wish to expand the cluster 106A of nodes, e.g., by adding a new database node 114C, which may then take responsibility for one or more portions of existing data (e.g., from the first, second, and/or both database nodes)—e.g., records T-Z 118C may be managed by the new node, relieving that responsibility from the second database node. Thus, the overall capacity of the database is increased, which may provide improved performance for its clients 102A-102B (e.g., executing within a service 108 of the provider network or within another, third-party network external to the provider network accessible via one or more intermediate networks 160 such as the Internet, and that access the database clusters 106 via a proxy layer 112 made up of one or more database proxies).

However, such rebalancing processes are very slow due to the mismatch between storage capacity and storage ingestion and/or data transmission rates. For example, there may be a huge amount of data stored that needs to be transmitted and added to a new database node (reflecting a "shard"), but a comparatively limited amount of bandwidth available for the transfer and processing capabilities to perform the necessary updating, leading to long network transmission times and/or ingestion times as shown by circle (A) in FIG. 1.

Moreover, the rebalancing process places additional load on the source database node(s), as reflected by circle (B). As such, dynamic scaling can exacerbate capacity shortages in the short term, leading to a risk of database throttling or outright downtime/unavailability due to excessive load placed on the shards, thus significantly affecting the performance of the existing cluster during the scaling process.

Figure 2:
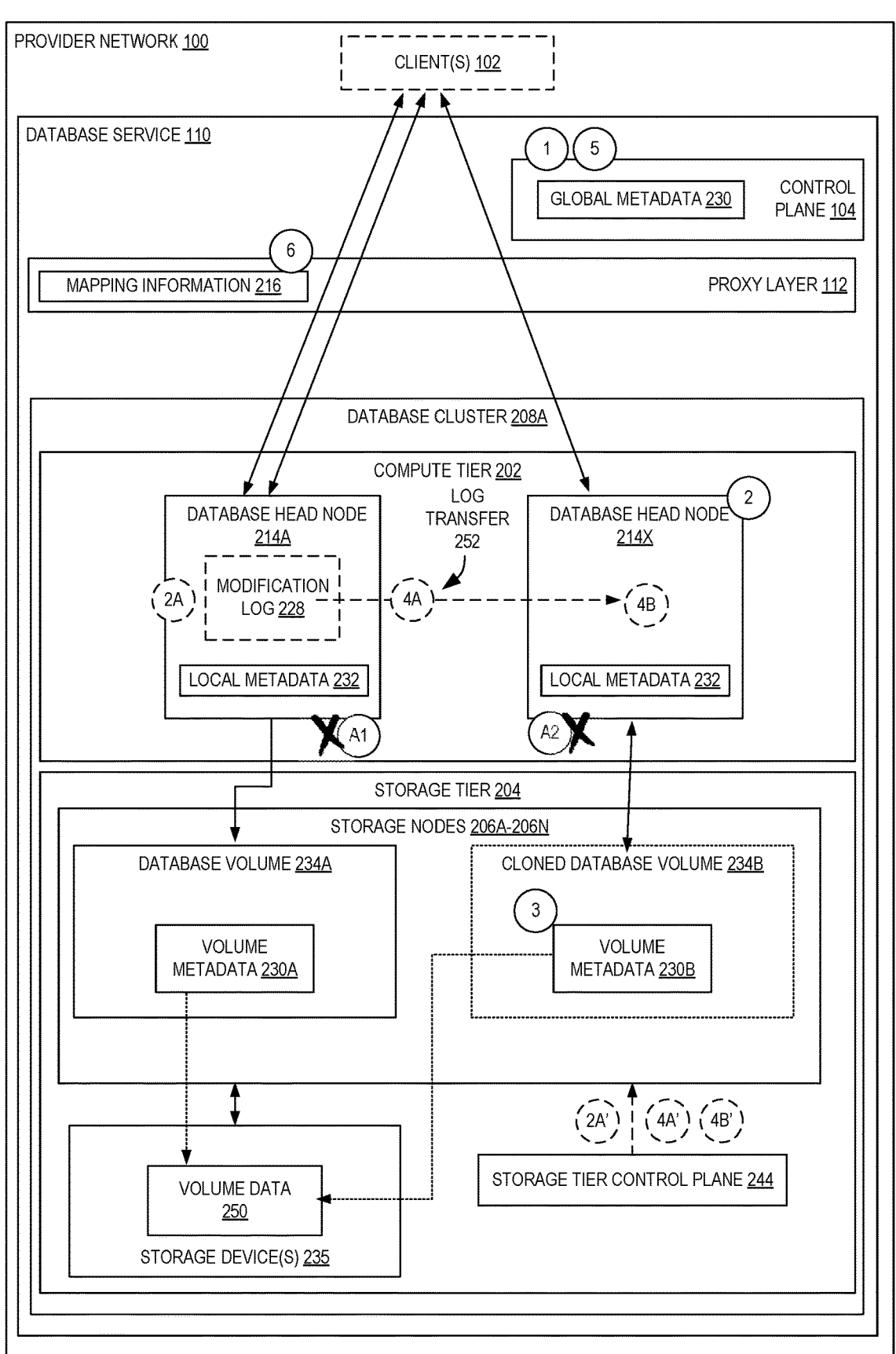
FIG. 2 is a diagram illustrating fast online scaling of a database via a split architecture including decoupled storage and compute tiers in a database service according to some embodiments.

According to some embodiments, database scaling is optimized by pushing rebalancing logic to a separate tier. FIG. 2 is a diagram illustrating a split architecture including a decoupled storage tier 204 and compute tier 202 in a database service according to some embodiments. Embodiments utilize a two-tier architecture: a compute tier 202 that manages query execution; and a storage tier 204 that manages data durability and consistency. Due to its constrained interface, the storage tier can be designed in a multi-tenant manner to support workloads from diverse users (e.g., of a multi-tenant provider network implementing the database, such as via a managed database service). The multi-tenancy of the storage tier can allow the system to support heat management in an effective manner In some embodiments, the system provider can over-provision the storage tier beyond the needs of any single user. The resource utilization for data rebalancing may be amortized against a large user base, thereby defraying the resource usage. Thus, in some embodiments, the storage tier can be implemented in a multi-tenant manner, thus allowing users to take advantage of larger capacity pool.

In some embodiments, the storage tier may be designed to support copy-on-write snapshots. Copy-on-write snapshots (e.g., taken of the data of a source shard/node) allow the system to quickly spin up a new shard/node (by using the copy-on-write snapshot to make the data available to a new shard as a virtual storage volume) without needing to immediately (or, ever) perform a complete physical copy of the underlying data. Embodiments include implementing a shard "split" primitive, where two nodes agree to split the data of a single shard. The copy-on-write primitive can drastically reduce the time needed to instantiate a new shard/node by avoiding a costly bulk load of the data.

In some embodiments, "lightweight" database head nodes 214 of a database cluster 208A may be used to quickly increase capacity. For example, the system may utilize a shared disk architecture via use of these "lightweight" head nodes 214 that do not require an actual copy of the data to be made. The system can leverage these read replicas to facilitate the dynamic scaling process without impacting a primary database node. For example, embodiments can use a read replica to replay a log of changes (e.g., via a log transfer 252) that arrive while the copy-on-write snapshot is being instantiated. By so doing, embodiments avoid impacting the foreground workload on a user's primary "writer" instance.

In some embodiments, the storage tier can perform extremely fast data transfers. For example, the storage tier may use copy-on-write volume clones, where a new volume 234B (created based on a database volume 234A) may be made accessible to a different database head node 214X using the same underlying stored volume data 250. Upon a database node making a change to its "own" view of the (shared) volume, the data may be written to a separate underlying storage area specific to that volume alone, effectively "forking" the underlying volume into a separate version based on the original. In some embodiments, this allows new database nodes to be launched/configured for use incredibly fast when compared to existing techniques requiring a complete transfer of the underlying data as a new copy. Further, as a new database node is launched, the underlying data of the volume need not be immediately (or, at all) moved to the database node (or, a separate storage location within the storage tier) itself, e.g., until needed in a lazy manner.

For a concrete example, in some embodiments a dataset of records 1-10 may be managed by a first database node 214A. The control plane 104 may detect that this first database node 214A has a heavy load and determine to scale the database by adding an additional database node 214X to relieve some of the heavy load. In some embodiments, a "snapshot" of the volume used by the first database node may be taken using a copy-on-write strategy, and this snapshot may be used to create a second database node 214X with access to the same data via a cloned database volume 234B, where it may have different volume metadata 230B (than volume metadata 230A) but point (at least initially) to the same underlying volume data 250 stored by one or more storage devices 235.

In some embodiments, with any modifications/writes that occur during this snapshot generation timeframe, these may be recorded in a modification log 228 and sent via a log transfer 252 (e.g., via a "stream" type transfer of such modifications that lasts for the duration of the transfer) may be created to capture changes made to the volume (or, to specific portions of the volume that are being "given" to a new node) that is provided to the new database node 214X to allow it to replay the changes at circle (4B) to "catch up" to the same state of the first database node.

In other embodiments, the underlying storage tier 204 itself may be implemented to, at circle 2A', configure itself to take note of the changes to the underlying database volume during the generation of the snapshot (e.g., a set of change/redo logs) and the subsequent attachment of a volume to a new database instance as reflected by circle (4A'), and thus may itself update the "new" database volume accordingly (e.g., which may include all of the data, or pointers to the original data) at circle (4B') by replaying the logs, thus removing the burden placed upon the database nodes in the compute tier. These actions may be performed by a storage tier control plane 244, or at least partially controlled by the storage tier control plane 244 (e.g., via configuring the associated storage nodes at circle (2A')) and performed by the storage nodes 206A-206M.

At some point—e.g., when both database nodes 214 are determined to be up-to-date a proxy layer 112 (e.g., a set of one or more database proxy nodes, a software router, etc.) may be updated (e.g., by updating its mapping information 216 cache associating types of database traffic, such as that associated with a particular partition of a database, with particular database nodes/network addresses) to cause traffic associated with a first portion of the datasets (e.g., datasets 1-8) to continue to be sent to the first database node 214A but traffic associated with a second portion of the datasets (e.g., datasets 9-10) to be sent to the new database node 214X. For example, the control plane 104 may send one or more messages to the proxy layer 112 to allow the proxy layer to update its mapping information 216 and thus be able to identify a partition key from a client's query (e.g., a particular value of a particular field or group of fields) and map this partition key to an identifier of the database head node that manages the associated data.

At this point, or at a later point, the database nodes 214 may then delete the portions of their volumes 234 that they are no longer responsible for, e.g., the first existing database node may drop datasets 9-10 while the new second database node may drop datasets 1-8. This can allow the database nodes themselves to retain as much capacity as possible, e.g., by trimming the amount of utilized addressable storage space to allow for further growth (even though the underlying storage may not actually have been modified). Notably, this pruning does not need to immediately occur, and may occur at a much later point in time, such as when load on the database is reduced. In some embodiments, the pruning may occur on a fine-grained level (e.g., record by record, table by table, etc.) though in other embodiments the pruning may occur via custom logic in the storage layer that is able to implement a more large-scale deletion with a single command (or limited set of commands).

Accordingly, a robustly-featured database can be enabled to implement scaling extremely quickly and efficiently. In some embodiments, a rapid lightweight "clone" of a database volume can be made, where volume metadata 230 associated with a volume (e.g., including pointers or identifiers of the underlying data) can be created in a storage tier for the new cloned volume while the underlying data of the volume need not be copied or modified, and then each side of the clone (e.g., each database head node) arranges to drop the (possibly) half of the data partitions each is no longer responsible for. This clone-and-drop approach provides fast, efficient data migration, as data movement happens at the storage tier and the source database instances do not incur processing, memory, or bandwidth related to the data transfer.

Thus, embodiments disclosed herein allow for rapid scaling of a database via fast volume clone techniques to efficiently create a copy of an existing shard (e.g., in seconds to minutes) and thereafter perform a metadata update to cause a proxy layer to redirect requests to the newly established shard. In some embodiments, after the completion of the clone, the system drops the unneeded data from each half of the split operation.

Accordingly, embodiments can be particularly fast, as adding a shard completes quickly, e.g., in seconds or minutes, instead of the tens of minutes or hours required in similar systems. Embodiments are also relatively simple to understand, implement, and operate, allowing for ease of implementation and ongoing maintenance.

Moreover, embodiments are also efficient, as the scaling mechanism has minimal impact on the user's foreground workload, and potentially zero (or near-zero) downtime, as the scaling mechanism does not trigger errors or downtime visible to the customer's application. A fundamental challenge to adding capacity is to do so without incurring downtime visible to the clients of the database. In embodiments disclosed herein, while the clone operation is very fast, it may not be instantaneous. Thus, in some embodiments, to avoid stalling writes, embodiments supplement the clone procedure with a lightweight log capture/replay mechanism, where writes to a database that arrive during the clone procedure are replayed onto the child shard before initiating a cutover.

As shown in FIG. 2, a database may be implemented in a provider network 100 (or, "cloud" provider network) that provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users can interact with a provider network 100 across one or more intermediate networks (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

Generally, the traffic and operations of a provider network can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes user resources that are implemented on the provider network (e.g., computing instances, containers, block storage volumes, databases, file storage). Data plane traffic generally includes non-administrative operations, such as transferring user data to and from the user resources. The control plane components are typically implemented on a separate set of servers from the data plane servers, and control plane traffic and data plane traffic can be sent over separate/distinct networks.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

The provider network 100 illustrated in FIG. 2 includes a database service 110, among any number of other services that it may offer to users. According to some embodiments, the database service 110 enables users to create, manage, and use databases (e.g., relational databases) in a cloud-based environment in a manner that provides enhanced security, availability, and reliability relative to other database environments. In some embodiments, the database service 110 features a distributed, fault-tolerant, and self-healing storage system that automatically scales (e.g., implemented in part using a scalable storage service). In some embodiments, a database system provided by a database service 110 organizes the basic operations of a database (e.g., query processing, transaction management, caching, and storage) into tiers that can be individually and independently scalable. For example, in some embodiments, each database instance provided by a database service 110 utilizes a compute tier (which may include one or more database nodes 214, sometimes also referred to as "head nodes"), and a separate and distributed storage tier (which may include multiple storage nodes 206 that collectively perform some of the operations traditionally performed in the database tier of existing database systems, and optionally a backup storage tier.)

In general, a database is a set of data, collection of records, or other grouping of data objects stored in a data store. In some embodiments, a data store includes one or more directly or network-attached storage devices (e.g., storing data that may be exposed as a virtual storage volume) accessible to a database engine 118 (e.g., block-based storage devices like hard disk drives or solid-state drives, file system, etc.). As indicated above, in some embodiments, the data store is managed by a separate storage service. In some embodiments, management of the data store at a separate storage service includes distributing the data amongst multiple different storage nodes (e.g., storage nodes 206) to provide redundancy and availability for the data.

In some embodiments, the data for a database is stored in one or more portions of the data store, such as data pages. One or multiple data values, records, or objects may be stored in a data page. In some embodiments, data pages further include metadata or other information for providing access to the database. For example, data pages can store data dictionaries, transaction logs, undo and redo log records, and so forth, though these may also be stored separately. A query engine 120 of a database engine 118 performs access requests (e.g., requests to read, obtain, query, write, update, modify, or otherwise access) based on state information. The state information can include, for example, data dictionaries, undo logs, transaction logs/tables, indexing structures, mapping information, data page caches or buffers, and the like, or any other information used to perform access requests with respect to the database. For example, state information may include mapping information (e.g., an index) used to obtain data records that match certain search criteria (e.g., query predicates).

In some embodiments, some operations of a database (e.g., backup, restore, recovery, log record manipulation, and/or various space management operations) can be offloaded from the database engine 118/compute tier to the storage tier and may be distributed across multiple storage nodes and associated storage devices. For example, in some embodiments, rather than a database engine 118 applying changes to a database (or data pages thereof) and then sending the modified data pages to the storage layer, the application of changes to the stored database (and data pages thereof) may be the responsibility of the storage layer itself. According to embodiments, a database engine 118 instead sends redo log records, rather than modified data pages, to the storage layer. The storage layer then performs redo processing (e.g., the application of the redo log records) in a distributed manner (e.g., by a background process running on the storage nodes 206).

More specific details of an exemplary implementation are now provided. In some embodiments, the database service may implement a scaling model based on four foundational abstractions. First, "collections" may be the equivalent of a relational table, and embodiments may support sharded collections whose contents are distributed across a set of nodes in a cluster of nodes. Next, "partitions" represent a subset of the data for a single collection. Embodiments support partitioning in a variety of ways, for example, hash partitioning according to a user-provided key, where each partition corresponds to a range of hashed key values. In some embodiments, logical shards represent a set of partitions that manage the same key space for all collections in the system. For example, a logical shard "37" manages the 37th hash bucket for all sharded collections. Further, "physical shards" may represent the resources (e.g., computational and storage) required to manage a set of logical shards. Each physical shard may map to a classic cluster.

The relationship between these entities may be as follows. A collection maps to one or more partitions, each corresponding to a subset of the key space. Each partition maps to a single logical shard, which is shared with other collections within the cluster. Each logical shard may be associated with a specific physical shard.

In some embodiments, the database service manages cluster metadata using two storage mechanisms: global metadata and local metadata. In some embodiments, global metadata 230 is managed by the database service control plane and may be stored in a storage system (e.g., a relational database or other). The global metadata 230 manages information about physical shards, including their number, configuration, and endpoint (e.g., a URL or other network address). As discussed below, global metadata may also store an eventually consistent snapshot of logical shard information.

Local metadata 232, in some embodiments, is stored on the database shards (e.g., database head nodes 214) alongside user data. Embodiments use local metadata 232 to manage logical shard metadata and collection metadata. Note that in some embodiments the system does not require explicit storage for partition metadata.

| Metadata type | Description | Where stored |
|---|---|---|
| Physical shards | Information about classic clusters | Global metadata |
| Logical shards | Information about groups of collection partitions that share a hash range | Local metadata (strongly consistent); global metadata (eventually consistent) |
| Collection metadata | Information about shard keys | Local metadata of a specific shard |
| Partition metadata | Information about collection partitions | Not stored explicitly |

Global Metadata

Global metadata serves two primary roles. First, it is the authoritative source of information about physical shards— i.e., the set of clusters. Second, global metadata stores an eventually consistent description of logical shards. In steady state, database service proxies can extract the physical-to-logical shard mappings entirely from global metadata. Global metadata may include the following information for each cluster:

An endpoint identifier (e.g., URL, network address, unique identifier, etc.) of the associated cluster.

A version number that is incremented with each change to the cluster configuration.

A wall clock timestamp of the cluster configuration.

The number of logical shards. This may be, for example, a power-of-two value (e.g., 1, 2, 4, 8, 16, etc.)

For each physical shard, embodiments maintain the following information:

A unique identifier value that uniquely identifies the physical shard.

An endpoint identifier (e.g., URL, network address, etc.) for the shard

An index of the shard, which may be used to route requests

A "state" of the shard, where valid states may include CREATING, ACTIVE, DYING, etc. These states may be used when adding or removing shards Each physical shard may be associated with an index, which is used to map physical shards to logical shards. The mapping scheme is analogous to consistent hashing in that both servers and keys are managed using the same hash key space. Consider an example with 128 logical shards and 4 physical shards. The physical shards are assigned index values 0, 32, 64, and 96. The first physical shard manages logical shards [0, 32); the second physical shard manages logical shards [32, 64); etc. Dynamic scaling may be achieved by introducing a new physical shard to the system. The system may assign a shard index that is equidistant to two existing shards.

Backup/restore poses challenges for managing cluster metadata. In general, embodiments assume that the shard configuration can change between cluster snapshots. As such, embodiments maintain all previous cluster configurations that refer to potentially valid restore points. However, that proxy layer may only care about the latest metadata snapshot for a cluster.

Local Metadata

Each physical shard may manage local metadata describing the logical shards that are locally present. Embodiments maintain a logical shard map that contains the following information:

Logical shard number

Logical shard state, e.g., one of {Active, Migrating, Inaccessible, Dying}

Physical shard successor (optional). For logical shards that have recently moved, the system may maintain the successor physical shard.

Embodiments also use local metadata to manage collection metadata. Embodiments assume the metadata for a given collection is maintained on a specific shard, and may maintain the following information for each collection:

The database and collection name. Collectively, these may serve as the primary key for collection metadata.

A unique identifier value that uniquely identifies the collection.

The shard key (or null for unsharded collections)

The logical shard(s) that house the data. Unsharded collections may map to a single logical shard, while sharded collections may map to all logical shards.

Steady State Request Routing

In this section, the flow of a data plane query according to some embodiments is provided, starting from a quiescent system without any client connections.

First, the client opens a new TCP connection to their database endpoint (e.g., a network address within a cloud private network that the client operates within). A load balancer may route the connection to a multi-tenant proxy of the database proxy layer described herein.

The proxy layer may extract the cloud provider network endpoint identifier from the request information (e.g., supplied by the load balancer). The proxy layer may fetch the shard metadata corresponding to the cluster. Shard metadata is cached for subsequent reuse.

The client performs authentication, and then may send a query using the database wire protocol. The proxy layer may decode the query and extract the target database and collection. The proxy layer may fetch collection metadata to obtain the shard key for the collection. Collection metadata is cached for subsequent reuse.

The proxy layer may hash the shard key and indexes into the array of logical shards. The proxy layer consults the shard metadata to map from logical shard(s) to a physical shard(s) and routes the request to the appropriate physical shards. The proxy layer collects the shard responses and sends a single aggregated response to the client, thus ending the flow.

Resolving a query involves mapping from a customer-visible collection name (e.g., "my_collection") to a low-level partition name (e.g., "_ls2_a8098c1a-f86e-11da-bd1a-00112444be1e"). Embodiments choose to implement this name mapping within the proxy layer, though other embodiments use an alternate strategy where the name resolution is pushed down to the database engine itself, for example, by leveraging the database engine's support for declarative partitioning. However, the proxy-centric approach has the benefit of confining the distributed systems complexity within one logical component.

Embodiments manage metadata related to physical shards, logical shards, and collections. Embodiments have the option of storing metadata globally or locally on the shards. Physical shard metadata may be stored globally to permit access to local metadata.

By contrast, collection metadata in some embodiments is stored on the single-tenant shards. Storing collection metadata locally on shards may reduce the blast radius from a noisy client. This is particularly relevant because list operations are difficult to cache at the proxy layer (e.g., list collections, list databases).

Regarding mapping collection metadata to shards, several approaches exist. One strategy is to store all collection metadata on a designated shard ("shard 0"). This approach is simple but carries the risk of introducing a hot spot if collection metadata is accessed frequently. A second approach is to partition the collection metadata across shards. In essence, this collection metadata may be viewed as a sharded collection, with the collection name as the shard key. This approach has the benefit of distributing load more evenly across the cluster. A final strategy is to redundantly store the complete collection metadata on every physical shard. The replicated metadata approach may prove beneficial to implement functionality that relies on resolving the customer-facing collection name (e.g., DML auditing).

A final form of metadata is the placement of logical shards. Embodiments use shard local metadata as the authoritative source for information about logical shards. This allows the system to use local transactions to manage logical shard metadata and data. Embodiments also replicate logical shard information to global metadata with eventual consistency. This construction allows proxies of the proxy layer to acquire the complete physical-to-logical shard mapping purely from global metadata in steady state, thereby reducing the miss penalty for filling a cold cache. During shard split events, proxies can update their view logical shard state by pulling routing "hints" from the physical shards.

Shard Split Protocol

The shard split protocol is utilized to introduce a new physical shard into a cluster. The foundation of the protocol is the use of volume clone functionality (e.g., not copying any/all underlying volume data, but merely creating metadata for a new volume that points to existing underlying data), which is used to quickly bootstrap a copy of an existing shard. After completion of the copy, the system drops half the data on each shard and updates metadata (global and local) to reflect the update. To make the protocol non-blocking, embodiments may also leverage a lightweight log capture/replay mechanism. Embodiments initiate logging prior to the clone, and ensure that all log records are replayed onto the client before initiating the cutover.

The protocol is now outlined at a high level with detail sufficient to enable a person of ordinary skill in the art to implement it. First, the new physical shard (the "child") is registered in global metadata in the CREATING state at circle (1) of FIG. 2. At this point, there is no backing for the shard.

Next, as step two, a split point is chosen that sub-divides the logical shards of the parent, and logging is enabled at circle (2) for the target logical shards that are to be migrated (as reflected by circle (2A)), though alternatively as shown by circle (2A') the storage tier control plane 244 may be configured to perform its own logging. As step three, a wait occurs for open transactions to quiesce (e.g., terminate, or otherwise enter a period of inactivity). The logging primitive may not contain the effects of pre-existing transactions. As such, embodiments introduce a barrier wait for open transactions, and may incorporate a timeout to forcibly close transactions that exceed a time limit.

As step four, the target logical shards are marked to have a state of MIGRATING in the logical shard map (e.g., in local metadata 232) on the parent shard (e.g., database head node 214A). The child shard may be identified here as the designated successor.

At step five, the parent volume is cloned (as reflected by circle (3)) using a lightweight clone functionality that does not copy any/all of the underlying data of the volume. The system then waits for the child shard to become active.

At step six, log records are applied to the child shard (e.g., per circle (4A) from a logical stream of changes provided from the parent head node 214A, or via the storage tier control plane at circle (4B)); if necessary, this step can forcibly timeout to guarantee convergence at the expense of increased downtime. As step seven, the target logical shards are marked as INACCESSIBLE on the parent shard. This causes in-flight and new queries to fail for the time being. At step eight, any remaining log records are applied, and as step nine, the target logical shards are marked with a state of ACTIVE on the child shard and marked with a state of DELETING on the parent shard.

As step ten, global metadata is updated at circle (5) to mark the child physical shard to the ACTIVE state, allowing full use of the new database head node 214X as well as continued use of the parent database head node 214A. At step eleven, the data for logical shards in the DELETING state is expunged as reflected by circles (A1) and (A2). This is a cleanup step that can happen at any point, e.g., it can completely or partially be performed during this shard split protocol (e.g., during or adjacent to the actual cloning) or after the shard split protocol has concluded in a lazy or delayed manner.

Request routing during the shard split procedure is similar to the steady state routing described above. However, during the cutover period (e.g., steps seven and eight), the logical shards may be inaccessible. Requests to the parent shard for the migrating logical shards may generates an error, where the error code indicates to the proxy layer that the request(s) can be safely retried. In addition, in some embodiments, the error contains a routing "hint" value that allows the proxy to update its routing cache without consulting global metadata. The hint thus avoids a "thundering herd" to global metadata (where large amounts of actors attempt to access a same resource—here the relevant metadata—at a same time) and allows global metadata to be eventually consistent.

The database engine, in some embodiments, supports operations on logical shards to support dynamic cluster scaling. Three high-level operations may be supported: first, a lightweight logging mechanism; second, concurrency control primitives; and third, a barrier wait mechanism for in-flight transactions.

The system supports a lightweight logical log that describes the set of modifications to the collection partitions within the logical shard. The lightweight log is conceptually similar to a change stream. However, the lightweight log can be smaller (and faster) because embodiments assume the existence of a reader node that can reconstruct the full system state. For example, the lightweight log might describe only the set of documents/records that were inserted or deleted within the given window. One possible entry format is as follows:

Two: Inaccessible. Access to partitioned collections returns an error. Read-only accesses that started prior to a state change may be allowed to continue (assuming continuity of the underlying snapshot).

Three: Dead. The logical shard no longer exists locally. Any access attempt returns an error. This is a terminal state (i.e., no out edge).

Finally, embodiments may support a barrier wait primitive for the operations on a logical shard. The barrier wait returns whenever any pre-existing transactions on the logical shard have terminated. The barrier wait accepts a timeout argument, after which any in-flight operations are summarily aborted.

Accordingly, pseudo code for the shard split procedure is provided as follows for further understanding:

```
'"Split a physical shard; assign half of the logical partitions to each side."'
# Step 1: Register a new shard in global metadata.
childShard = GenerateNewShard( )
md = globalMetadata.GetLatestGlobalMetadata(clusterId)
md.AddShard(childShard, state=CREATING)
globalMetadata.SetGlobalMetadata(md)
# Step 2: Choose a split point and enable logging for target logical shards
parentLogicalShards, childLogicalShards = parentShard.PrepareSplit( )
parentShard.EnableLogging(childLogicalShards)
# Step 3: Barrier wait for transactions to complete.
parentShard.TransactionBarrierWait(childLogicalShards,timeout=MAX_TRANSACTION_T
IME)
# Step 4: Set logical shard state to migrating
parentShard.SetLogicalShardState(childLogicalShards, MIGRATING)
# Step 5: Initiate volume clone; replay the log
childShard.CreateFromClone(source=parentShard)
childShard.WaitForActive( )
# Step 6: Replay the log onto the child
while (logRecords := parentshard.ReadLog( )):
childShard.ApplyLog(logRecords)
# Step 7: Mark the target logical shards as inaccessible on the parent.
parentShard.SetLogicalShardState(childLogicalShards, INACCESSIBLE)
childShard.SetLogicalShardState(parentLogicalShards, DEAD)
# Step 8: Apply any remaining log records
while (logRecords := parentShard.ReadLog( )):
childShard.ApplyLog(logRecords)
# Step 9: Mark the logical shards as active on the child
childShard.SetLogicalShardState(destShards, ACTIVE)
# Step 10: Mark the logical shards as deleting on the parent
parentShard.SetLogicalShardState(destShards, DELETING)
# Step 11: Update global metadata to reflect the new logical shard ownership. At this point,
all
data is readable by the proxy tier.
md = globalMetadata.GetGlobalMetadata( )
md.SetShardState(childShard, ACTIVE)
md.SetOwnership(parentShard, parentLogicalShards)
md.SetOwnership(childShard, childLogicalShards)
globalMetadata.SetLatestShardState(clusterId, md)
# Step 12: Remove logical shards that are no longer required. Note that this operation can
proceed asynchronously in the background.
parentShard.SetLogicalShardState(childShards, DEAD)
```

```
Struct LogEntry {
  int64 logOffset;
  int32 collectionOid; // assume unique within the log
  byte[14] documentId;
  byte documentIdBsonType
  byte entryType; // insert or delete; update is a combination of these
};
```

Second, embodiments support concurrency control at the granularity of logical shards. The system may support at least three possible states as described below. Note that the logical shard states persist across system restarts.

One: Active. All partition collections within the logical shard are accessible.

Figure 3:
FIG. 3 is a diagram illustrating exemplary components of a database system compute tier utilized with a distinct storage tier according to some embodiments.

For further detail into the split architecture, FIG. 3 is a diagram illustrating aspects of a compute tier utilized for a database in a database service according to some embodiments. In this example, database system 300 includes a respective database engine head node 214 for each of several databases and a storage tier, e.g., implemented using a distributed storage service (which may or may not be visible to the clients of the database system, shown as database clients 102A-102N). As illustrated in this example, one or more of database clients 102102A-102102N may access a database head node 214 (e.g., head node 214A, etc., head node 214N, each of which is a component of a respective database instance) via one or more networks (e.g., these components may be network-addressable and accessible to the database clients 102102A-102102N) and through a proxy layer 112. However, the storage tier, which may be employed by the database system to store a database volume (such as data pages of one or more databases, as well as redo log records and/or other metadata associated therewith) and/or copies of a database volume on behalf of database clients 102102A-102102N, and to perform other functions of the database system as described herein, may or may not be network-addressable and accessible to the storage clients 102102A-102102N, in different embodiments. For example, in some embodiments, the storage tier 204—via storage nodes 206A-206M— may perform various storage, access, change logging, recovery, log record manipulation, and/or space management operations in a manner that is invisible to storage clients 102A-102N.

As previously noted, each database instance may include a database engine head node 214 that receives requests (e.g., queries to read or write data, etc.) from various clients, such as programs (e.g., applications) and/or subscribers (users). The database engine head node 214 may parse them, optimize them, and develop an execution plan to carry out the associated database operation(s). In the example illustrated in FIG. 3, a query engine component 120 of a database engine 118 of a database engine head node 214A may perform these functions for queries that are received from database client 102A and that target the database instance of which database engine head node 214A is a component. In some embodiments, the database engine 118 may return query responses to the database clients 102, which may include record sets, write acknowledgements, requested data pages (or portions thereof), error messages, and/or other responses, as appropriate. As illustrated in this example, database engine head node 214A may also include a client-side storage service driver 325, which may route read requests and/or redo log records to various storage nodes 206 within storage tier 204, receive write acknowledgements from storage tier 204, receive requested data pages from storage tier 204, and/or return data pages, error messages, or other responses to query engine 305 (which may, in turn, return them to database client 102A). Client-side storage driver 325 may maintain mapping information about the database volume stored in storage tier 204, such that a particular protection group maintaining a partition of the database volume may be determined. Read requests and redo log records may then be routed to storage nodes 206 that are members of the protection group according to the partition of user data to which the read request is directed or to which the redo log record pertains.

In this example, database engine head node 214A includes in memory 304 a data page cache 335, in which data pages that were recently accessed may be temporarily held. Data pages in the cache may be retained in the event of an online restore operation, to perform faster query processing operations using local data, etc., in some embodiments. Database engine head node 214A may additionally or alternatively include a transaction and consistency management component, which may be responsible for providing transactionality and consistency in the database instance of which database engine head node 214A is a component. For example, this component may be responsible for ensuring the Atomicity, Consistency, and Isolation properties of the database instance and the transactions that are directed that the database instance. As illustrated in FIG. 3, database engine head node 214A may also include a transaction log 340 and an undo log 345, which may be employed by the transaction and consistency management component to track the status of various transactions and roll back any locally cached results of transactions that do not commit.

Note that other database engine head nodes 214 (e.g., nodes 214B-214N) may include similar components and may perform similar functions for queries (or other database statements) received by one or more of database clients 102A-102N and directed to the respective database instances of which it is a component.

In some embodiments, the storage tier 204 described herein may organize data in various logical data volumes, extents (which may include partitions of the database (e.g., user data space) in the volume and a segmentation of the log for the volume) made durable among a protection group of storage nodes, segments (which may be data stored on an individual storage node of a protection group) and pages for storage on one or more storage nodes. For example, in some embodiments, each database is represented by a logical volume, and each logical volume is partitioned over a collection of storage nodes into extents. A protection group may be composed of different storage nodes in the storage service that together make an extent durable. Multiple segments, each of which lives on a particular one of the storage nodes in a protection group, can be used to make the extent durable.

In some embodiments, each data page may be stored in a segment, such that each segment stores a collection of one or more data pages and a change log (also referred to as a redo log) (e.g., a log of redo log records) for each data page that it stores. Thus, change logs may be log records segmented to the protection group of which the segment is a member. The storage nodes may receive redo log records and to coalesce them to create new versions of the corresponding data pages (e.g., if a data page of a copy of a database is shared with the database and the new version is created to create a different version included in the copy and not visible to the database) and/or additional or replacement log records (e.g., lazily and/or in response to a request for a data page or a database crash). In some embodiments, data pages and/or change logs may be mirrored across multiple storage nodes, according to a variable configuration, such as in a protection group (which may be specified by the client on whose behalf the databases are being maintained in the database system). For example, in different embodiments, one, two, or three copies of the data or change logs may be stored in each of one, two, or three different availability zones or regions, according to a default configuration, an application-specific durability preference, or a client-specified durability preference.

Figure 4:
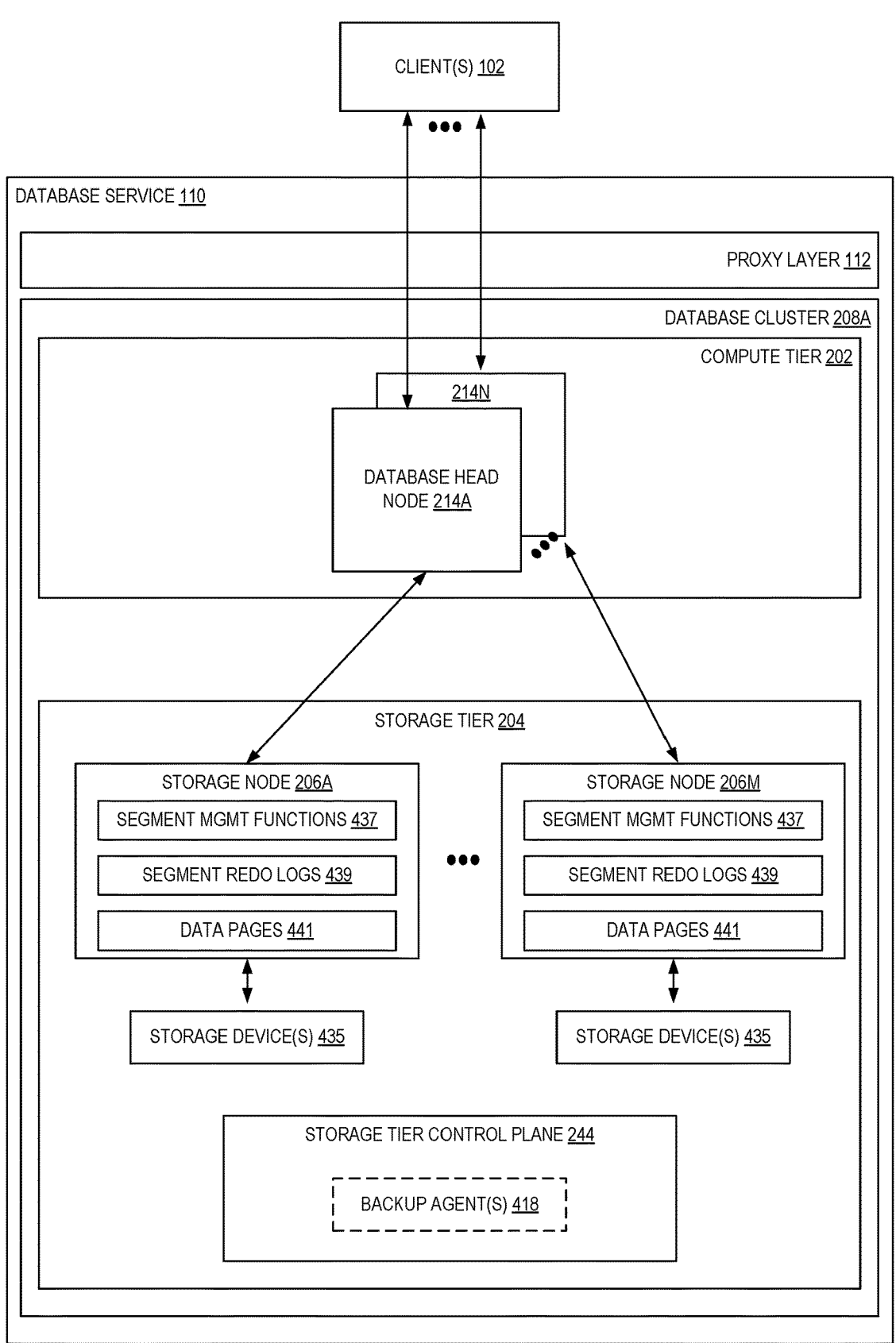
FIG. 4 is a diagram illustrating exemplary components of a distributed storage tier of a database system utilized with a distinct compute tier according to some embodiments.

One embodiment of a storage tier is illustrated by the block diagram in FIG. 4. Specifically, FIG. 4 is a diagram illustrating aspects of a storage tier utilized for a database in a database service according to some embodiments. In at least some embodiments, storage nodes 206A-206M may store data for different clients as part of a multi-tenant storage service. For example, the various segments may correspond to different protection groups and volumes for different clients.

In some embodiments, a client (from the perspective of the storage tier), such as a database engine head node 214, may communicate with storage tier 204 storage nodes 206A-206M that store data as part of a database managed by a client-side storage service driver at the client. In this example, the storage tier 204 includes multiple storage tier storage nodes 206A-206M, each of which may include storage for data pages 441 and redo logs 439 for the segment(s) it stores, and hardware and/or software may perform various segment management functions 437. For example, each storage tier 204 storage node 206 may include hardware and/or software that may perform at least a portion of any or all of the following operations: replication (locally, e.g., within the storage node), coalescing of redo logs to generate data pages, log management (e.g., manipulating log records), crash recovery (e.g., determining candidate log records for volume recovery), creating snapshots of segments stored at the storage node and/or space management (e.g., for a segment or state storage). Each storage tier 204 storage node 206 may also have one or multiple attached storage devices 435 (e.g., SSDs, HDDs, or other persistent storage devices) on which data blocks may be stored on behalf of clients (e.g., users, client applications, and/or database service subscribers).

In the example illustrated in FIG. 4, storage tier 204 storage node 206A includes data page(s) 441, segment redo log(s) 439, segment management functions 437, and attached storage devices 435. Similarly, storage tier 204 storage node 206M includes data page(s) 441, segment redo log(s) 439, segment management functions 447, and attached storage devices 435.

In some embodiments, each of the storage tier 204 storage nodes 206 in the storage system may implement a set of processes running on the node's operating system that manage communication with the database engine head node, e.g., to receive redo logs, send back data pages, etc. In some embodiments, all data blocks written to the storage system may be backed up to long-term and/or archival storage (e.g., in a remote key-value durable backup storage system).

In some embodiments, storage tier 204 may also implement a storage tier control plane 244. Storage tier control plane 244 may be one or more compute nodes that may perform a variety of different storage system management functions. For example, storage tier control plane 244 may implement a volume manager (not illustrated), which may maintain mapping information or other metadata for a volume, such as current volume state, current writer, truncation tables or other truncation information, or any other information for a volume as it is persisted in varying different, extents, segments, and protection groups. The volume manager may communicate with a client of storage tier 204, such as client-side storage driver in order to "mount" or "open" the volume for the client, providing the client-side storage driver with mapping information, protection group policies, and various other information necessary to send write and read requests to storage nodes 206. The volume manager may provide the maintained information to storage clients, such as a database engine head node 214 or client-side storage driver or to other system components such as backup agents 418. For example, the volume manager may provide a current volume state (e.g., clean, dirty or recovery), current epoch or other version indicator for the volume and/or any other information about the data volume.

In at least some embodiments, storage tier control plane 244 may implement a backup management component. The backup management component may implement or direct multiple backup agents 418 which may backup data volumes stored at storage nodes. For example, in some embodiments task queue(s) may be implemented that identify backup operations to be performed with respect to data volumes (e.g., describing the range of LSNs of redo log records being included in a chunk or portion of data that is to be uploaded to the backup data store). Volume backup metadata may be included as part of the backup performed by backup agent(s) 418, including the volume geometry or configuration. Changes made to a database after a restore operation may be included in a log. Backups of the log records, whether or not the log records are within an exclusion range may be performed, in some embodiments by backup agent(s) 418.

Figure 5:
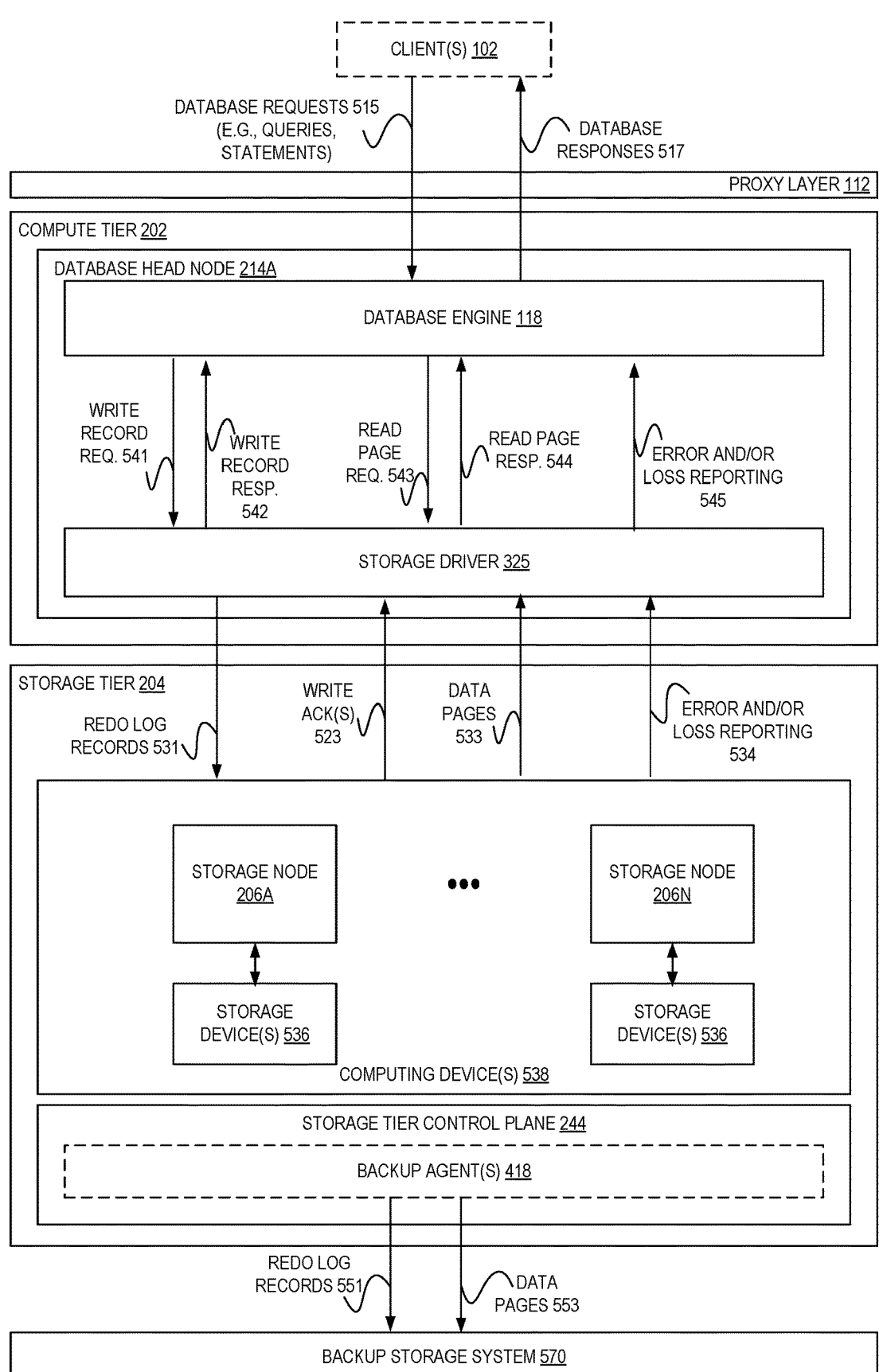
FIG. 5 is a diagram illustrating exemplary operational aspects of a split architecture database including decoupled storage and compute tiers in a database service according to some embodiments.

FIG. 5 is a diagram illustrating exemplary operational aspects of a split architecture database including decoupled storage and compute tiers in a database service according to some embodiments. In this example, one or more client 102 processes may read from and/or store data to one or more databases maintained by a database system that includes a database engine 118 of a compute tier 202 and a separate storage tier 204. In the example illustrated in FIG. 5, database head node 214A includes database tier components described elsewhere herein (e.g., a database engine 118) and a client-side storage driver 325. In some embodiments, the database engine 118 may perform functions such query parsing, optimization and execution, and transaction and consistency management, e.g., as discussed in FIG. 3, and/or may store data pages, transaction logs and/or undo logs (such as those stored by data page cache 335, transaction log 340 and undo log 345 of FIG. 3). In various embodiments, database engine 118 may have obtained a volume epoch indicator or other identifier from storage tier 204 granting access writes to a particular data volume, such as by sending a request to open the data volume to storage tier 204.

In this example, one or more client 102 processes may send database requests 515 (e.g., queries or other statements, which may include read and/or write requests targeting data stored by one or more of the storage nodes 206A-206N implemented by computing device(s) 538) to the database engine 118 and may receive database responses 517 back from the compute tier 202 (e.g., responses that include write acknowledgements and/or requested data). Each database request 515 may be processed by the database engine 118 and result in a need to write to a data page, and thus may be parsed and optimized by the database engine 118 to generate one or more write record requests 541, which may be sent to client-side storage driver 325 for subsequent routing to storage tier 204. In this example, client-side storage driver 325 may generate one or more redo log records 531 corresponding to each write record request 541 and may send them to specific ones of the storage nodes 206 of specific protection groups storing the partition user data of user data space to which the write record request pertains in storage tier 204. Storage nodes 206 may perform various peer-to-peer communications to replicate redo log records 531 received at a storage node to other storage nodes that may have not received the redo log records 531. For instance, not every storage node may receive a redo log record in order to satisfy a write quorum (e.g., three out of five storage nodes may be sufficient). The remaining storage nodes that do not receive or acknowledge the redo log record may receive an indication of it from a peer storage node that did acknowledge or receive the redo log record. Client-side storage driver 325 may generate metadata for each of the redo log records that includes an indication of a previous log sequence number of a log record maintained at the specific protection group. Storage tier 204 may return a corresponding write acknowledgement(s) 523 for each redo log record 531 to client-side storage driver 325. The client-side storage driver 325 may pass these write acknowledgements to the database engine 118 (as write responses 542), which may then send corresponding responses (e.g., write acknowledgements or result sets) to one or more client 102 processes as one of database query responses 517.

In this example, each database request 515 that results in a request to read a data page may be parsed and optimized to generate, by the database engine 118, one or more read page requests 543, which may be sent to client-side storage driver 325 for subsequent routing to storage tier 204. In this example, client-side storage driver 325 may send these requests to specific ones of the storage nodes 206 of storage tier 204, and storage tier 204 may return the requested data pages 533 to client-side storage driver 325. The client-side storage driver 325 may send the returned data pages to the database engine 118 as return pages responses 544, and database engine 118 may then use the data pages to generate database query responses 517.

In some embodiments, various error and/or data loss messages 534 may be sent from storage tier 204 to database engine 118 (specifically to client-side storage driver 325). These messages may be passed from client-side storage driver 325 to database engine 118 as error and/or loss reporting messages 545, and then optionally to one or more client 102 processes along with (or instead of) a database query response 517.

In some embodiments, backup agents 418 may receive peer-to-peer indications from storage nodes 206. By evaluating these indications backup agents 418 may identify additional redo log records received at storage nodes 206 that have not been backed up. Backup agent(s) 418 may send chunks or objects containing a set of redo log records 551 to backup storage system 570 to be stored as part of a backup version of the data volume. In some embodiments, data pages 553 to create a full backup of the data volume (as opposed to log records describing the changes to the data volume) or copy of the data volume that may reference data pages stored in another data volume in backup storage system 570 may be requested from storage nodes and sent to backup storage system 570.

In some embodiments, the APIs 531-534 of storage tier 204 and the APIs 541-545 of client-side storage driver 325 may expose the functionality of the storage tier 204 to database engine 118 as if database engine 118 were a client of storage tier 204. For example, database engine 118 (through client-side storage driver 325) may write redo log records or request data pages through these APIs to perform (or facilitate the performance of) various operations of the database system implemented by the combination of database engine 118 and storage tier 204 (e.g., storage, access, change logging, recovery, and/or space management operations). As illustrated in FIG. 5, storage tier 204 may store data blocks on storage nodes 206A-206N, each of which may have multiple attached SSDs. In some embodiments, storage tier 204 may provide high durability for stored data block through the application of various types of redundancy schemes.

Note that in various embodiments, the API calls and responses between compute tier 202 and storage tier 204 (e.g., APIs 531-534) and/or the API calls and responses between client-side storage driver 325 and database engine 118 (e.g., APIs 541-545), and between backup agents 418 and backup data store 570 in FIG. 5 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of network-based services. REST is an architectural style for hypermedia systems. A RESTful API (which may also be referred to as a RESTful network-based service) is a network-based service API implemented using HTTP and REST technology. The APIs described herein may in some embodiments be wrapped with client libraries in various languages, including, but not limited to, C, C++, Java, C# and Perl to support integration with system components.

In the storage systems described herein, an extent may be a logical concept representing a highly durable unit of storage that can be combined with other extents (either concatenated or striped) to represent a volume. Each extent may be made durable by membership in a single protection group. An extent may provide an LSN-type read/write interface for a contiguous byte subrange having a fixed size that is defined at creation. Read/write operations to an extent may be mapped into one or more appropriate segment read/write operations by the containing protection group. As used herein, the term "volume extent" may refer to an extent that is used to represent a specific sub-range of bytes within a volume.

As noted above, a data volume may consist of multiple extents, each represented by a protection group consisting of one or more segments. In some embodiments, log records directed to different extents may have interleaved LSNs. For changes to the volume to be durable up to a particular LSN it may be necessary for all log records up to that LSN to be durable, regardless of the extent to which they belong. In some embodiments, the client may keep track of outstanding log records that have not yet been made durable, and once all ULRs up to a specific LSN are made durable, it may send a Volume Durable LSN (VDL) message to one of the protection groups in the volume. The VDL may be written to all synchronous mirror segments (i.e., group members) for the protection group. This is sometimes referred to as an "Unconditional VDL" and it may be periodically persisted to various segments (or more specifically, to various protection groups) along with write activity happening on the segments. In some embodiments, the Unconditional VDL may be stored in log sector headers.

As used herein, a volume may be a logical concept representing a highly durable unit of storage that a user/client/application of the storage system understands, in some embodiments. A volume may be stored or maintained in a distributed store that appears to the user/client/application as a single consistent ordered log of write operations to various user pages of a database. Each write operation may be encoded in a User Log Record (ULR), which represents a logical, ordered mutation to the contents of a single user page within the volume. As noted above, a ULR may also be referred to herein as a redo log record. Each ULR may include a unique identifier (e.g., a Logical Sequence Number (LSN)) assigned from a log sequence number space. Each ULR may be persisted to one or more synchronous segments in the log-structured store that form a Protection Group (PG) maintaining the partition of user data space (i.e. extent) to which the update indicate by the log record pertains in order to provide high durability and availability for the ULR. A volume may provide an LSN-type read/write interface for a variable-size contiguous range of bytes. In some embodiments, a volume may consist of multiple extents, each made durable through a protection group. In such embodiments, a volume may represent a unit of storage composed of a mutable contiguous sequence of Volume Extents. Reads and writes that are directed to a volume may be mapped into corresponding reads and writes to the constituent volume extents. In some embodiments, the size of a volume may be changed by adding or removing volume extents from the end of the volume.

FIG. 6 is a flow diagram illustrating operations 600 of a method for scaling a database cluster using a decoupled storage and compute architecture according to some embodiments. Some or all of the operations 600 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 600 are performed by the database service 110 of FIG. 2.

The operations 600 include, at block 602, determining to add a new database (DB) node to a cluster of one or more DB nodes implementing a database in a database service, wherein the cluster includes a first DB node of a compute tier of the database service. In some embodiments, block 602 includes receiving a command originated on behalf of a user of the database service to scale the database; or determining that an autoscaling condition of a scaling policy is satisfied, wherein the autoscaling condition is based at least in part on a metric associated with the cluster or with individual DB nodes of the cluster.

The operations 600 include, at block 604, scaling the cluster of one or more DB nodes to add at least the new DB node. Block 604 includes, at block 610, determining a split for data, of a first volume, managed by the first DB node, the split including a first portion of the data to remain managed by first DB node and a second portion of the data to be managed by the new DB node.

Block 604 includes, at block 612, obtaining a second DB node, in the compute tier, to serve as the new DB node. Obtaining the second DB node may include, for example, obtaining a compute instance from a hardware virtualization service, launching a compute instance, etc.

Block 604 includes, at block 614, cloning the first volume, within a storage tier that is distinct from the compute tier, to yield a second volume for use by the second DB node, wherein the cloning does not involve making a complete copy of the data of the first volume. In some embodiments, block 614 includes creating, as the second volume, a copy-on-write volume based on creating one or more metadata elements for the second volume that identify the data of the first volume, wherein the copy-on-write volume does not include a distinct copy of the data of the first volume.

Block 604 includes, at block 616, applying, after the cloning, a set of database modifications to the second volume, where the set of database modifications resulted from database traffic received by the first DB node, involving the second portion, during the cloning of the first volume.

In some embodiments, block 616 occurs within/by the storage tier without the involvement of the compute tier, and may include: identifying, by the storage tier, modifications to the first volume; and causing, by the storage tier, the modifications to be applied to the second volume.

Block 604 includes, at block 618, updating a proxy layer to begin sending database traffic involving the second portion of the data to the second DB node. In some embodiments, block 'Z18 includes at least transmitting a message, to the proxy layer, including data identifying a set of one or more partition key values and identifying the second DB node.

In some embodiments, block 604 further includes configuring the first DB node to insert, into a modification log, data corresponding to the set of database modifications, and transmitting the data from the modification log to the second DB node, where the applying of the set of database modifications occurs at least in part via the second DB node of the compute tier and includes obtaining, by the second DB node, the data corresponding to the set of database modifications from the first DB node.

Optionally, in some embodiments the operations 600 further include, at block 630, causing the first DB node to delete the second portion of the data from the first volume; and at block 632, causing the second DB node to delete the first portion of data from the second volume. In some embodiments, blocks 630 and/or 632 may be completed after the scaling of the cluster, though one or both of these blocks may be initiated during the scaling (and optionally partially or completely performed during the scaling) of block 604, and possibly completed some amount of time after the conclusion of the scaling as the deletion may not be time crucial and thus delaying its completion until after the scaling has occurred can allow for the production use of the scaled-up database sooner.

In some embodiments, the database service is implemented within a multi-tenant cloud provider network, and the storage tier provides the first volume and the second volume to the first DB node and the second DB node via use of a plurality of storage nodes implemented by a plurality of computing devices, where the plurality of computing devices are multi-tenant and provide storage tier services for the database service to multiple different databases of multiple different users.

In some embodiments the operations 600 further include, prior to the cloning of the first volume, waiting up to a period of time for existing transactions involving the first DB node to complete before proceeding with the cloning of the first volume.

In some embodiments, during or after the cloning of the first volume, but prior to the updating of the proxy layer, the operations 600 further include: receiving a request at the first DB node involving the second portion of data that is to be managed by the new DB node; and sending a response message to the proxy layer indicating that the request is denied. In some embodiments, the response message indicates that the request can be retried, and in some embodiments, the response message further includes a hint value allowing the proxy layer to update its routing cache to send additional requests involving the second portion of data to the second DB node.

Figure 7:
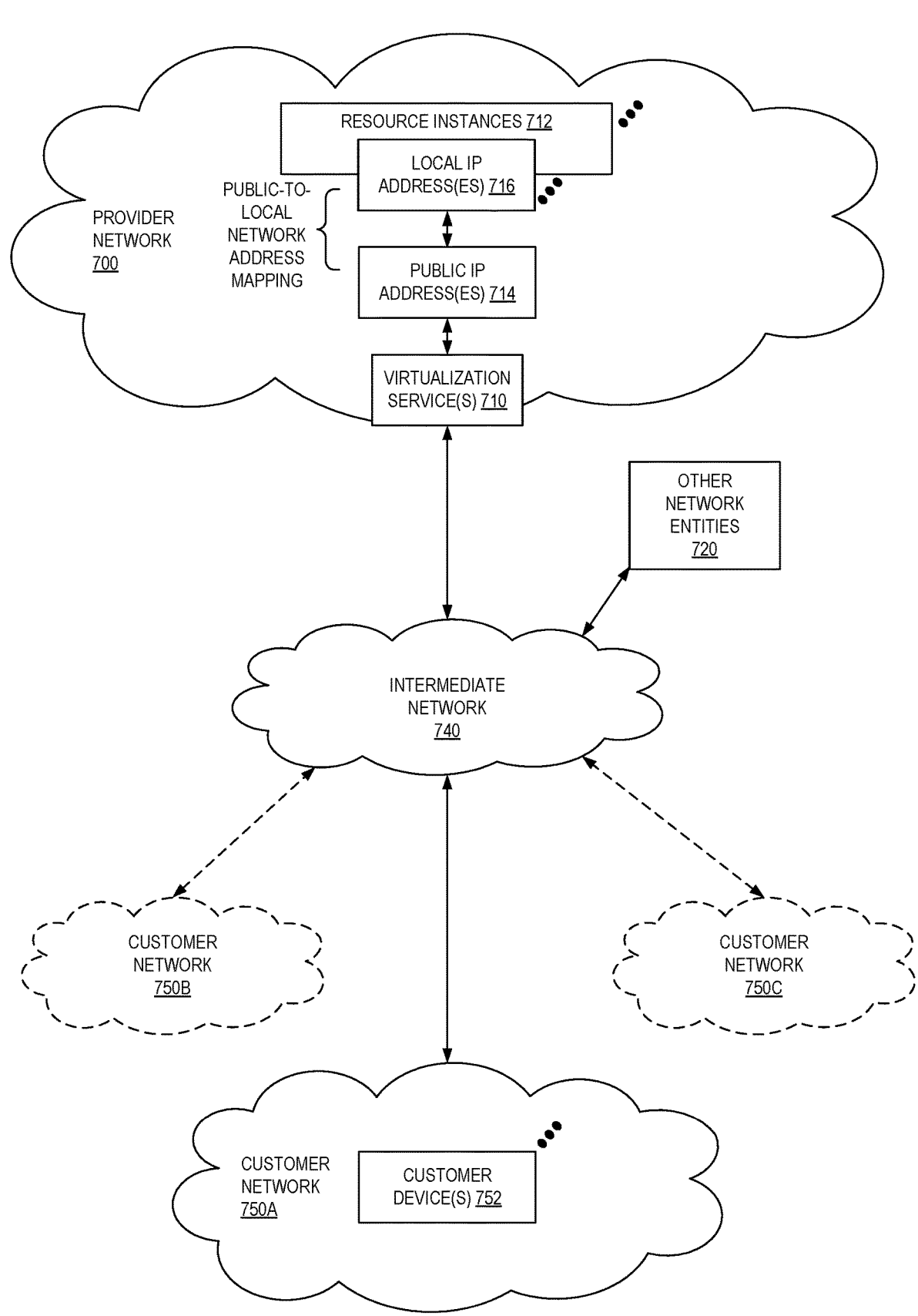
FIG. 7 illustrates an example provider network environment according to some embodiments.

FIG. 7 illustrates an example provider network (or "service provider system") environment according to some embodiments. A provider network 700 can provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 can be associated with the resource instances 712; the local IP addresses are the internal network addresses of the resource instances 712 on the provider network 700. In some embodiments, the provider network 700 can also provide public IP addresses 714 and/or public IP address ranges (e.g., Internet Protocol version 4

(IPv4) or Internet Protocol version 6 (IPv6) addresses) that customers can obtain from the provider 700.

Conventionally, the provider network 700, via the virtualization services 710, can allow a customer of the service provider (e.g., a customer that operates one or more customer networks 750A-750C (or "client networks") including one or more customer device(s) 752) to dynamically associate at least some public IP addresses 714 assigned or allocated to the customer with particular resource instances 712 assigned to the customer. The provider network 700 can also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of the customer network(s) 750A-750C can, for example, implement customer-specific applications and present the customer's applications on an intermediate network 740, such as the Internet. Other network entities 720 on the intermediate network 740 can then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 can be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some embodiments, the mapping of a standard IP address to a local IP address of a resource instance is the default launch configuration for all resource instance types.

At least some public IP addresses can be allocated to or obtained by customers of the provider network 700; a customer can then assign their allocated public IP addresses to particular resource instances allocated to the customer. These public IP addresses can be referred to as customer public IP addresses, or simply customer IP addresses. Instead of being assigned by the provider network 700 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
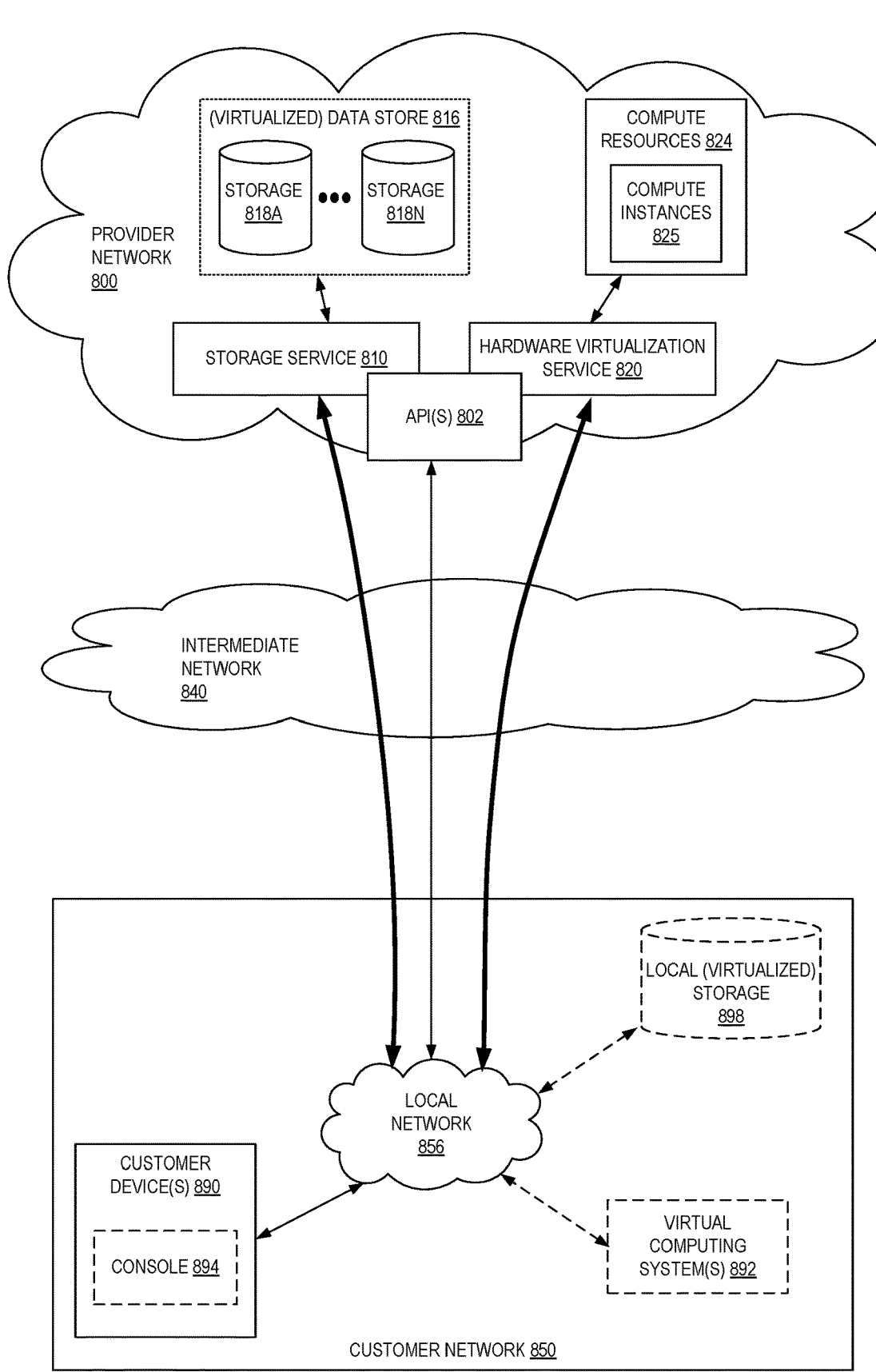
FIG. 8 is a block diagram of an example provider network that provides a storage service and a hardware virtualization service to customers according to some embodiments.

FIG. 8 is a block diagram of an example provider network environment that provides a storage service and a hardware virtualization service to customers, according to some embodiments. A hardware virtualization service 820 provides multiple compute resources 824 (e.g., compute instances 825, such as VMs) to customers. The compute resources 824 can, for example, be provided as a service to customers of a provider network 800 (e.g., to a customer that implements a customer network 850). Each computation resource 824 can be provided with one or more local IP addresses. The provider network 800 can be configured to route packets from the local IP addresses of the compute resources 824 to public Internet destinations, and from public Internet sources to the local IP addresses of the compute resources 824.

The provider network 800 can provide the customer network 850, for example coupled to an intermediate network 840 via a local network 856, the ability to implement virtual computing systems 892 via the hardware virtualization service 820 coupled to the intermediate network 840 and to the provider network 800. In some embodiments, the hardware virtualization service 820 can provide one or more APIs 802, for example a web services interface, via which the customer network 850 can access functionality provided by the hardware virtualization service 820, for example via a console 894 (e.g., a web-based application, standalone application, mobile application, etc.) of a customer device 890. In some embodiments, at the provider network 800, each virtual computing system 892 at the customer network 850 can correspond to a computation resource 824 that is leased, rented, or otherwise provided to the customer network 850.

From an instance of the virtual computing system(s) 892 and/or another customer device 890 (e.g., via console 894), the customer can access the functionality of a storage service 810, for example via the one or more APIs 802, to access data from and store data to storage resources 818A-818N of a virtual data store 816 (e.g., a folder or "bucket," a virtualized volume, a database, etc.) provided by the provider network 800. In some embodiments, a virtualized data store gateway (not shown) can be provided at the customer network 850 that can locally cache at least some data, for example frequently accessed or critical data, and that can communicate with the storage service 810 via one or more communications channels to upload new or modified data from a local cache so that the primary store of data (the virtualized data store 816) is maintained. In some embodiments, a user, via the virtual computing system 892 and/or another customer device 890, can mount and access virtual data store 816 volumes via the storage service 810 acting as a storage virtualization service, and these volumes can appear to the user as local (virtualized) storage 898.

Figure 9:
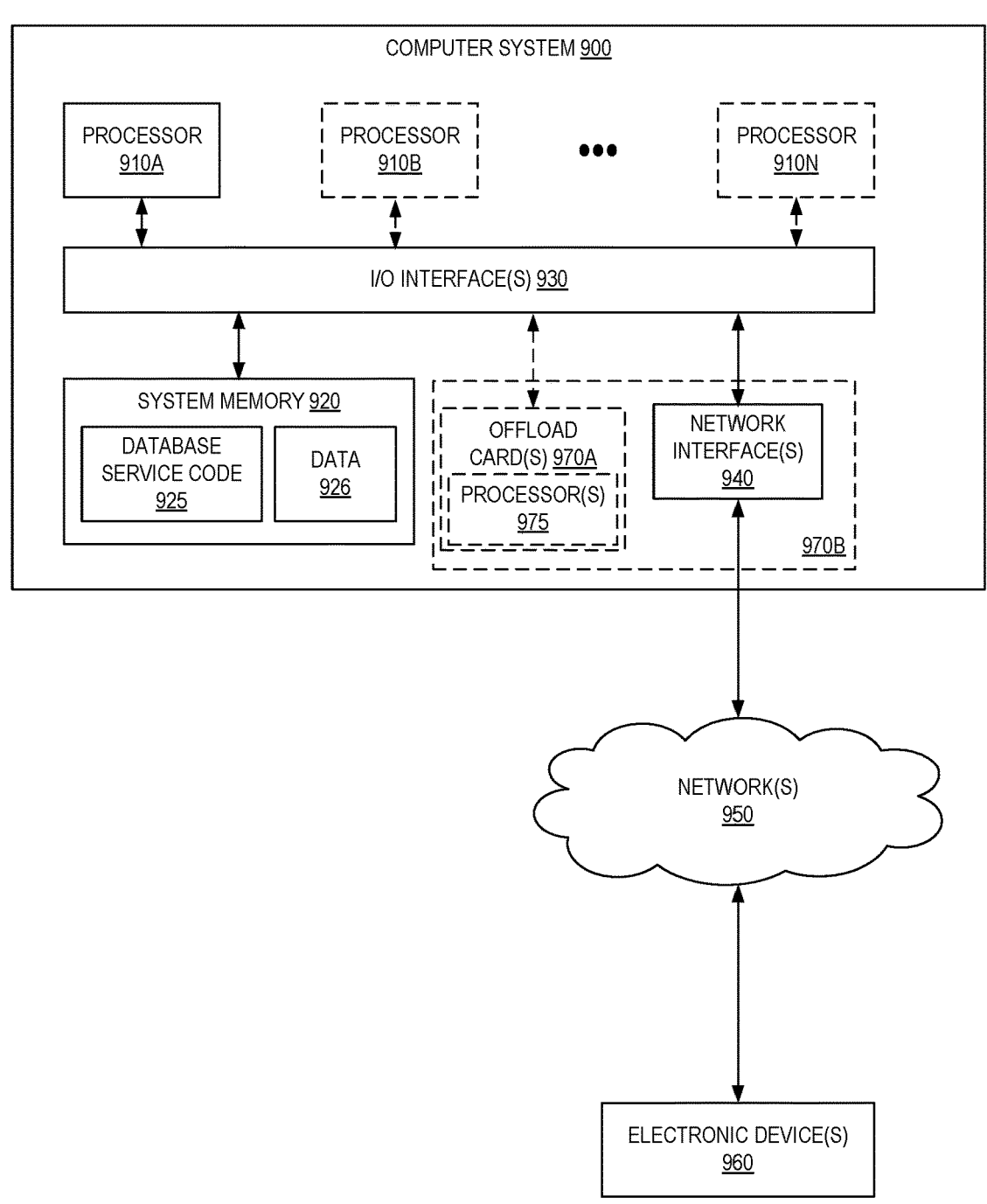
FIG. 9 is a block diagram illustrating an example computer system that can be used in some embodiments.

While not shown in FIG. 8, the virtualization service(s) can also be accessed from resource instances within the provider network 800 via the API(s) 802. For example, a customer, appliance service provider, or other entity can access a virtualization service from within a respective virtual network on the provider network 800 via the API(s) 802 to request allocation of one or more resource instances within the virtual network or within another virtual network. Illustrative Systems In some embodiments, a system that implements a portion or all of the techniques described herein can include a general-purpose computer system, such as the computer system 900 illustrated in FIG. 9, that includes, or is config- ured to access, one or more computer-accessible media. In the illustrated embodiment, the computer system 900 includes one or more processors 910 coupled to a system memory 920 via an input/output (I/O) interface 930. The computer system 900 further includes a network interface 940 coupled to the I/O interface 930. While FIG. 9 shows the computer system 900 as a single computing device, in various embodiments the computer system 900 can include one computing device or any number of computing devices configured to work together as a single computer system 900.

In various embodiments, the computer system 900 can be a uniprocessor system including one processor 910, or a multiprocessor system including several processors 910 (e.g., two, four, eight, or another suitable number). The processor(s) 910 can be any suitable processor(s) capable of executing instructions. For example, in various embodi- ments, the processor(s) 910 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 910 can commonly, but not necessarily, implement the same ISA.

The system memory 920 can store instructions and data accessible by the processor(s) 910. In various embodiments, the system memory 920 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 920 as database service code 925 (e.g., executable to implement, in whole or in part, the database service 110) and data 926.

In some embodiments, the I/O interface 930 can be configured to coordinate I/O traffic between the processor 910, the system memory 920, and any peripheral devices in the device, including the network interface 940 and/or other peripheral interfaces (not shown). In some embodiments, the I/O interface 930 can perform any necessary protocol, timing, or other data transformations to convert data signals from one component (e.g., the system memory 920) into a format suitable for use by another component (e.g., the processor 910). In some embodiments, the I/O interface 930 can include support for devices attached through various types of peripheral buses, such as a variant of the Peripheral Component Interconnect (PCI) bus standard or the Universal Serial Bus (USB) standard, for example. In some embodi- ments, the function of the I/O interface 930 can be split into two or more separate components, such as a north bridge and a south bridge, for example. Also, in some embodiments, some or all of the functionality of the I/O interface 930, such as an interface to the system memory 920, can be incorpo- rated directly into the processor 910.

The network interface 940 can be configured to allow data to be exchanged between the computer system 900 and other devices 960 attached to a network or networks 950, such as other computer systems or devices as illustrated in FIG. 1, for example. In various embodiments, the network interface 940 can support communication via any suitable wired or wireless general data networks, such as types of Ethernet network, for example. Additionally, the network interface 940 can support communication via telecommunications/ telephony networks, such as analog voice networks or digital fiber communications networks, via storage area networks (SANs), such as Fibre Channel SANs, and/or via any other suitable type of network and/or protocol.

In some embodiments, the computer system 900 includes one or more offload cards 970A or 970B (including one or more processors 975, and possibly including the one or more network interfaces 940) that are connected using the I/O interface 930 (e.g., a bus implementing a version of the Peripheral Component Interconnect-Express (PCI-E) stan- dard, or another interconnect such as a QuickPath intercon- nect (QPI) or UltraPath interconnect (UPI)). For example, in some embodiments the computer system 900 can act as a host electronic device (e.g., operating as part of a hardware virtualization service) that hosts compute resources such as compute instances, and the one or more offload cards 970A or 970B execute a virtualization manager that can manage compute instances that execute on the host electronic device. As an example, in some embodiments the offload card(s) 970A or 970B can perform compute instance management operations, such as pausing and/or un-pausing compute instances, launching and/or terminating compute instances, performing memory transfer/copying operations, etc. These management operations can, in some embodiments, be per- formed by the offload card(s) 970A or 970B in coordination with a hypervisor (e.g., upon a request from a hypervisor) that is executed by the other processors 910A-910N of the computer system 900. However, in some embodiments the virtualization manager implemented by the offload card(s) 970A or 970B can accommodate requests from other entities (e.g., from compute instances themselves), and can not coordinate with (or service) any separate hypervisor.

In some embodiments, the system memory 920 can be one embodiment of a computer-accessible medium configured to store program instructions and data as described above. However, in other embodiments, program instructions and/ or data can be received, sent, or stored upon different types of computer-accessible media. Generally speaking, a com- puter-accessible medium can include any non-transitory storage media or memory media such as magnetic or optical media, e.g., disk or DVD/CD coupled to the computer system 900 via the I/O interface 930. A non-transitory computer-accessible storage medium can also include any volatile or non-volatile media such as RAM (e.g., SDRAM, double data rate (DDR) SDRAM, SRAM, etc.), read only memory (ROM), etc., that can be included in some embodi- ments of the computer system 900 as the system memory 920 or another type of memory. Further, a computer-acces- sible medium can include transmission media or signals such as electrical, electromagnetic, or digital signals, con- veyed via a communication medium such as a network and/or a wireless link, such as can be implemented via the network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) can be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various embodiments.

References to "one embodiment," "an embodiment," "an example embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated.

The specification and drawings are, accordingly, to be regarded in an illustrative rather than a restrictive sense. It will, however, be evident that various modifications and changes can be made thereunto without departing from the broader spirit and scope of the disclosure as set forth in the claims.

What is claimed is:

1. A computer-implemented method, comprising:
    determining to add a new database (DB) node to a cluster of one or more DB nodes implementing a database in a database service, wherein the cluster of DB nodes includes a first DB node operating in a compute tier of the database service that is implemented by a first one or more electronic devices and that manages query execution, wherein the database service further includes a storage tier implemented by a second one or more electronic devices that includes storage nodes that manage the storage and durability of data of databases operated upon by the compute tier;
    scaling the cluster of DB nodes to add at least the new DB node, comprising:
        registering the new DB node in global metadata managed by a control plane of the database service;
        determining a logical split for data of a first volume in the storage tier, wherein the first volume is managed by the first DB node in the compute tier, the logical split including a first portion of the data to remain managed by the first DB node and a second portion of the data to be managed by the new DB node;
        obtaining a second DB node, in the compute tier, to serve as the new DB node;
        cloning the first volume, within the storage tier, to yield a second volume in the storage tier for use by the second DB node in the compute tier, wherein the cloning copies less than all of the first volume within the storage tier;
        configuring the second DB node in the compute tier to utilize the second volume in the storage tier;
        applying, after the cloning, a set of database modifications to the second volume in the storage tier, where the set of database modifications resulted from traffic received by the first DB node in the compute tier during the cloning of the first volume;
        updating the global metadata to indicate a deleting state for the second portion of the data on the first DB node;
        updating the global metadata to indicate the second DB node is active and to begin sending database traffic involving the second portion of the data to the second DB node in the compute tier;
    causing the first DB node in the compute tier to delete the second portion of the data that is in the deleting state from the first volume in the storage tier; and
    causing the second DB node in the compute tier to delete the first portion of the data from the second volume in the storage tier.

2. The computer-implemented method of claim 1, further comprising prior to the cloning of the first volume, waiting up to a period of time for existing transactions involving the first DB node to complete before proceeding with the cloning of the first volume.

3. The computer-implemented method of claim 1, wherein during or after the cloning of the first volume, but prior to the updating of the global metadata to indicate the second DB node is active, the method further comprises:
    receiving a request at the first DB node involving the second portion of the data that is to be managed by the new DB node; and sending a response message to a proxy layer of the database service indicating that the request is denied, wherein the response message at least one of:
indicates that the request can be retried; or
includes a hint value allowing the proxy layer to update its routing cache to send additional requests involving the second portion of the data to the second DB node.

4. A computer-implemented method, comprising:
determining to add a new database (DB) node to a cluster of one or more DB nodes implementing a database in a database service, wherein the cluster includes a first DB node of a compute tier of the database service; and
scaling the cluster of one or more DB nodes to add at least the new DB node, comprising:
registering the new DB node in global metadata managed by a control plane of the database service;
determining a logical split for data of a first volume in a storage tier that is distinct from the compute tier, wherein the first volume is managed by the first DB node in the compute tier, the logical split including a first portion of the data to remain managed by the first DB node and a second portion of the data to be managed by the new DB node;
obtaining a second DB node, in the compute tier, to serve as the new DB node;
cloning the first volume, within the storage tier, to yield a second volume in the storage tier for use by the second DB node in the compute tier, wherein the cloning copies less than all of the data of the first volume;
applying, after the cloning, a set of database modifications to the second volume in the storage tier, where the set of database modifications resulted from database traffic received by the first DB node in the compute tier, involving the second portion of the data, during the cloning of the first volume;
updating the global metadata to indicate a deleting state for the second portion of the data on the first DB node;
updating the global metadata to indicate the second DB node is active and to begin sending database traffic involving the second portion of the data to the second DB node in the compute tier; and
expunging the second portion of the data on the first DB node that is in the deleting state.

5. The computer-implemented method of claim 4, further comprising causing the second DB node to delete the first portion of the data from the second volume.

6. The computer-implemented method of claim 5, wherein after the scaling of the cluster the second DB node deletes at least some of the first portion of the data from the second volume.

7. The computer-implemented method of claim 4, wherein scaling the cluster further comprises:
configuring the first DB node to insert, into a modification log, data corresponding to the set of database modifications; and
transmitting the data, from the modification log, to the second DB node, wherein the applying of the set of database modifications occurs at least in part via the second DB node of the compute tier and includes obtaining, by the second DB node, the data corresponding to the set of database modifications from the first DB node.

8. The computer-implemented method of claim 4, wherein the applying of the set of database modifications occurs within the storage tier without the involvement of the compute tier and includes:
identifying, by the storage tier, modifications to the first volume; and
causing, by the storage tier, the modifications to be applied to the second volume.

9. The computer-implemented method of claim 4, wherein cloning the first volume to yield the second volume comprises creating, as the second volume, a copy-on-write volume based on creating one or more metadata elements for the second volume that identify the data of the first volume, wherein the copy-on-write volume does not include a distinct copy of the data of the first volume.

10. The computer-implemented method of claim 4, wherein the determining to add the new DB node to the cluster comprises:
receiving a command originated on behalf of a user of the database service to scale the database; or
determining that an autoscaling condition of a scaling policy is satisfied, wherein the autoscaling condition is based at least in part on a metric associated with the cluster or with individual DB nodes of the cluster.

11. The computer-implemented method of claim 4, wherein the database service is implemented within a multi-tenant cloud provider network, and wherein the storage tier provides the first volume and the second volume to the first DB node and the second DB node via use of a plurality of storage nodes implemented by a plurality of computing devices, wherein the plurality of computing devices are multi-tenant and provide storage tier services for the database service to multiple different databases of multiple different users.

12. The computer-implemented method of claim 4, wherein updating the proxy layer includes at least transmitting a message, to the proxy layer, including data identifying a set of one or more partition key values and identifying the second DB node.

13. The computer-implemented method of claim 4, further comprising, prior to the cloning of the first volume, waiting up to a period of time for existing transactions involving the first DB node to complete before proceeding with the cloning of the first volume.

14. The computer-implemented method of claim 4, wherein during or after the cloning of the first volume, but prior to the updating of the proxy layer, the method further comprises:
receiving a request at the first DB node involving the second portion of the data that is to be managed by the new DB node; and
sending a response message to the proxy layer indicating that the request is denied.

15. The computer-implemented method of claim 14, wherein the response message indicates that the request can be retried.

16. The computer-implemented method of claim 15, wherein the response message further includes a hint value allowing the proxy layer to update its routing cache to send additional requests involving the second portion of the data to the second DB node.

17. A system comprising:
a first one or more computing devices to implement a compute tier of a database service in a multi-tenant provider network to manage query execution against databases;

a second one or more computing devices to implement a storage tier of the database service to manage storage and durability of data of the databases operated upon by the compute tier; and a third one or more computing devices to implement a control plane of the database service in the multi-tenant provider network, the control plane including instructions that upon execution cause the control plane to:

determine to add a new database (DB) node to a cluster of one or more DB nodes implementing a database of the databases, wherein the cluster includes a first DB node implemented in the compute tier; and scale the cluster of one or more DB nodes to add at least the new DB node, comprising:

registering the new DB node in global metadata managed by the control plane of the database service;

determining a logical split for data of a first volume in the storage tier, wherein the first volume is managed by the first DB node in the compute tier, the logical split including a first portion of the data to remain managed by the first DB node and a second portion of the data to be managed by the new DB node;

obtaining a second DB node, in the compute tier, to serve as the new DB node;

causing the storage tier to clone the first volume to yield a second volume in the storage tier for use by the second DB node in the compute tier, wherein the cloning copies less than all of the data of the first volume;

causing an application, after the cloning, of a set of database modifications to the second volume in the storage tier, where the set of database modifications resulted from database traffic received by the first DB node in the compute tier, involving the second portion of the data, during the cloning of the first volume;

updating the global metadata to indicate a deleting state for the second portion of the data on the first DB node;

updating the global metadata to indicate the second DB node is active and to begin sending database traffic involving the second portion of the data to the second DB node in the compute tier; and expunging the second portion of the data on the first DB node that is in the deleting state.

18. The system of claim 17, wherein the control plane further includes instructions that upon execution further cause the control plane to cause the second DB node to delete the first portion of the data from the second volume.

19. The system of claim 17, wherein causing the second DB node to delete the first portion of the data from the second volume occurs after the scaling of the cluster.

20. The system of claim 17, wherein to scale the cluster, the control plane is further to configure the first DB node to insert, into a data stream, data corresponding to the set of database modifications, wherein the application of the set of database modifications occurs at least in part via the compute tier and includes obtaining, by the second DB node, the data corresponding to the set of database modifications from the data stream.

* * * * *